United States Patent
Luo et al.

(10) Patent No.: US 8,055,081 B2
(45) Date of Patent: Nov. 8, 2011

(54) IMAGE CLASSIFICATION USING CAPTURE-LOCATION-SEQUENCE INFORMATION

(75) Inventors: Jiebo Luo, Pittsford, NY (US); Junsong Yuan, Evanston, IL (US)

(73) Assignee: Eastman Kodak Company, Rochester, NY (US)

( * ) Notice: Subject to any disclaimer, the term of this patent is extended or adjusted under 35 U.S.C. 154(b) by 777 days.

(21) Appl. No.: 12/102,395

(22) Filed: Apr. 14, 2008

(65) Prior Publication Data

US 2009/0257663 A1 Oct. 15, 2009

(51) Int. Cl.
*G06K 9/64* (2006.01)
(52) U.S. Cl. .......................... 382/224; 382/278; 707/748
(58) Field of Classification Search .................. 382/100, 382/103, 106, 107, 128–132, 170, 217–220, 382/224–228, 276, 278, 291; 396/310, 322; 707/748–772
See application file for complete search history.

(56) References Cited

U.S. PATENT DOCUMENTS

| | | | | |
|---|---|---|---|---|
| 6,819,783 | B2 * | 11/2004 | Goldberg et al. | 382/115 |
| 7,580,952 | B2 * | 8/2009 | Logan et al. | 1/1 |
| 7,680,340 | B2 * | 3/2010 | Luo et al. | 382/224 |
| 7,813,560 | B2 * | 10/2010 | Kraus et al. | 382/224 |
| 7,860,320 | B2 * | 12/2010 | Luo et al. | 382/227 |
| 2004/0064339 | A1 | 4/2004 | Shiota et al. | |
| 2004/0208365 | A1 | 10/2004 | Loui et al. | |
| 2005/0105775 | A1 * | 5/2005 | Luo et al. | 382/115 |
| 2005/0128305 | A1 | 6/2005 | Hamasaki et al. | |
| 2006/0104520 | A1 | 5/2006 | Kraus et al. | |
| 2006/0221779 | A1 * | 10/2006 | Matsushita et al. | 369/30.01 |
| 2007/0081813 | A1 | 4/2007 | Hong et al. | |
| 2007/0297683 | A1 * | 12/2007 | Luo et al. | 382/224 |
| 2008/0049976 | A1 * | 2/2008 | Isomura et al. | 382/106 |
| 2008/0089590 | A1 * | 4/2008 | Isomura et al. | 382/217 |
| 2008/0089592 | A1 * | 4/2008 | Isomura | 382/224 |
| 2008/0205771 | A1 * | 8/2008 | Kraus et al. | 382/224 |
| 2010/0111428 | A1 * | 5/2010 | Yu et al. | 382/228 |

OTHER PUBLICATIONS

Lazebnik et al., Beyond Bags of Features: Spatial Pyramid Matching for Recognizing Natural Scene Categories, pp. 1-8, Jun. 2006.
Zhu et al., Multi-class AdaBoost, Jan. 12, 2006, pp. 0-20.
Li et al., What, where and who? Classifying events by scene and object recognition, pp. 1-7, Oct. 2007.
Liao et al., Extracting Places and Activities from GPS Traces Using Hierarchical Codnitional Random Fields, pp. 1-20, 2005.

* cited by examiner

*Primary Examiner* — Manav Seth
(74) *Attorney, Agent, or Firm* — Justin D. Petruzzelli

(57) ABSTRACT

Classification of a group of temporally related images is disclosed, wherein a capture-location sequence is identified from the group of temporally related images. The capture-location-sequence information, which is associated collectively with the capture-location sequence, is compared with each of a plurality of sets of predetermined capture-location-sequence characteristics. Each set is associated with a predetermined classification. An identified classification associated with the group of temporally related images is identified based at least upon results from the comparing step; and the identified classification is stored in a processor-accessible memory system.

20 Claims, 7 Drawing Sheets

| EVENTS OF LARGE SPATIAL RANGES | EVENTS OF SMALL SPATIAL RANGES |
|---|---|
| CITY TOUR, HIKING, ROAD TRIP | BACKYARD, BEACH, BALL GAME, PICNIC, WEDDING |

| EVENTS OF HIGH MOVING SPEED | EVENTS OF LOW TO MEDIUM MOVING SPEED |
|---|---|
| ROAD TRIP | CITY TOUR, HIKING, BACKYARD, BEACH, BALL GAME, PICNIC, WEDDING |

FIG. 2

IMAGE CLASSIFICATION USING CAPTURE-LOCATION-SEQUENCE INFORMATION

FIELD OF THE INVENTION

The present invention is related to artificial intelligence and image understanding, and in particular, to classification of a collection of temporally related images.

BACKGROUND

Consumer photo collections are pervasive. Mining semantically meaningful information from such collections has been an area of active research in machine learning and computer vision communities. There is a large body of work focusing on problems of object recognition, such as detecting objects of certain types like faces, cars, grass, water, sky, and so on. Most of this work relies on using low level vision features (such as color, texture and lines) available in the image. In the recent years, there has been an increasing focus on extracting semantically more complex information such as scene detection and activity recognition. For example, existing systems have attempted at recognizing events through visual classification of scenes and objects, see for example in L.-J. Li and L. Fei-Fei, "What, where and who? classifying events by scene and object recognition," in Proc. IEEE Intl. Conf. on Computer Vision, 2007. This system reported moderate success in recognizing a number of peculiar sports events, such as polo, rowing, and boche, due to the unique visual characteristics that can be observed from pictures of such events.

In all the above mentioned prior art, traditional image clustering and classification is performed based on individual images and using image-based features only, for example, color and edge histograms, or "bag of visual features" (see S. Lazebnik, C. Schmid, and J. Ponce, "Beyond bags of features: spatial pyramid matching for recognizing natural scene categories," in Proc. IEEE Conf. on Computer Vision and Pattern Recognition, 2006.).

However, images are often not independent of each other due to the temporal and spatial correlation among the images that belong to the same event. More specifically, in personal image collections, there is rich context information other than the image features, and such context information is usually complementary to the image features for the purpose of semantic understanding.

Accordingly, improved image classification techniques that consider the relationships between images are needed.

SUMMARY OF THE INVENTION

The above-described problem is addressed and a technical solution is achieved in the art by a system and a method for facilitating classification of a group of temporally related images according to various embodiments of the present invention. In an embodiment of the present invention, a capture-location sequence is identified from the group of temporally related images. The capture-location-sequence information, which is associated collectively with the capture-location sequence, is compared with each of a plurality of sets of predetermined capture-location-sequence characteristics. Each set is associated with a predetermined classification. An identified classification associated with the group of temporally related images is identified based at least upon results from the comparing step; and the identified classification is stored in a processor-accessible memory system.

Advantages of the present invention include using a collection of personal images having associated capture-location information to recognize events.

In addition to the embodiments described above, further embodiments will become apparent by reference to the drawings and by study of the following detailed description.

BRIEF DESCRIPTION OF THE DRAWINGS

FIG. 2 is a table showing the characteristics of different events in terms of spatial range and moving speed;

DETAILED DESCRIPTION OF THE INVENTION

Collective inference can be a useful tool for classifying image. For example, it may be difficult to tell for a particular picture if it is work or leisure, but looking at other pictures that belong to the same event, it might become easier to make the same prediction. In embodiments of the present invention, image classification is carried out within the context of a collection of temporally related images that have associated capture location information. The phrase "image classification", as used herein, refers to a process of classifying a group of temporally related images into one of a pre-determined set of activities. Further, the phrases "event recognition" and "activity recognition", as used herein, are examples of image classification. Further still, the words "image", "picture", and "photo" are used interchangeably herein.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular and/or plural in referring to the "method" or "methods" and the like is not limiting.

In addition, it should be noted that, unless otherwise explicitly noted or required by context, the word "or" is used in this disclosure in a non-exclusive sense.

When GPS (Global Positioning System) sensors are installed in digital cameras, latitude, longitude and the time of image capture can be collected for each individual image captured. In addition, the following information can be captured for each individual image captured using techniques known in the art low-level image features: e.g., color and edge histogram; semantic object and scene recognition: output from object detectors (e.g., faces) and image classifiers (indoor/outdoor detector, beach detector, etc.); and other context information: images taken around the same time and same places (e.g., images in the same event or same image folder).

Figure 6:
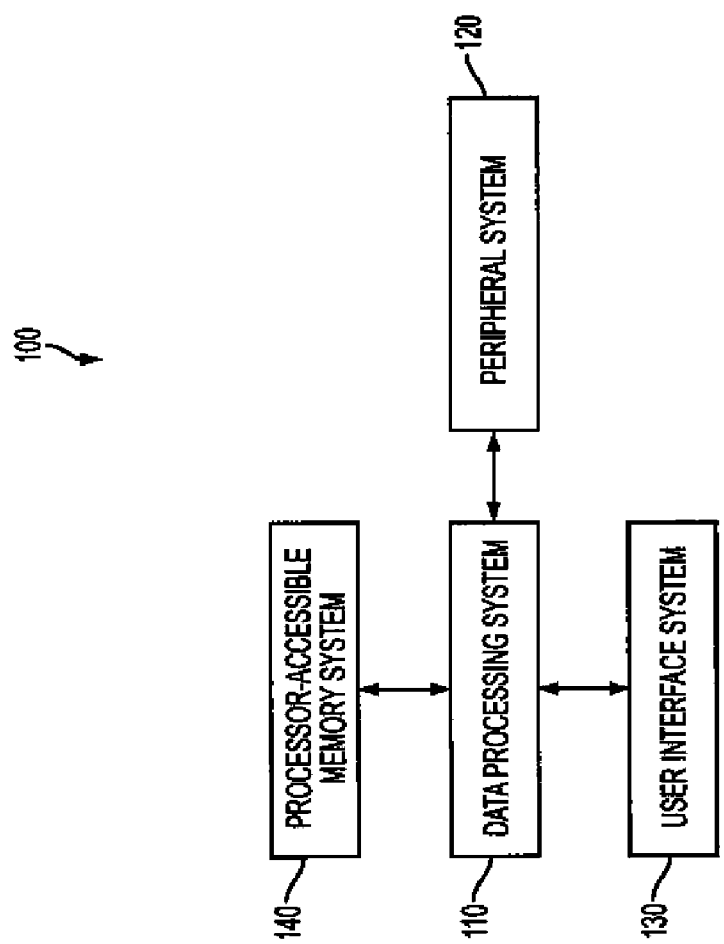
FIG. 6 illustrates a system for event recognition using a photo collection and an associated capture-location trace, according to an embodiment of the present invention.

FIG. 6 illustrates a system 100 for event recognition, according to an embodiment of the present invention. The system 100 includes a data processing system 110, a peripheral system 120, a user interface system 130, and a processor-accessible memory system 140. The processor-accessible memory system 140, the peripheral system 120, and the user interface system 130 are communicatively connected to the data processing system 110.

Figure 1:
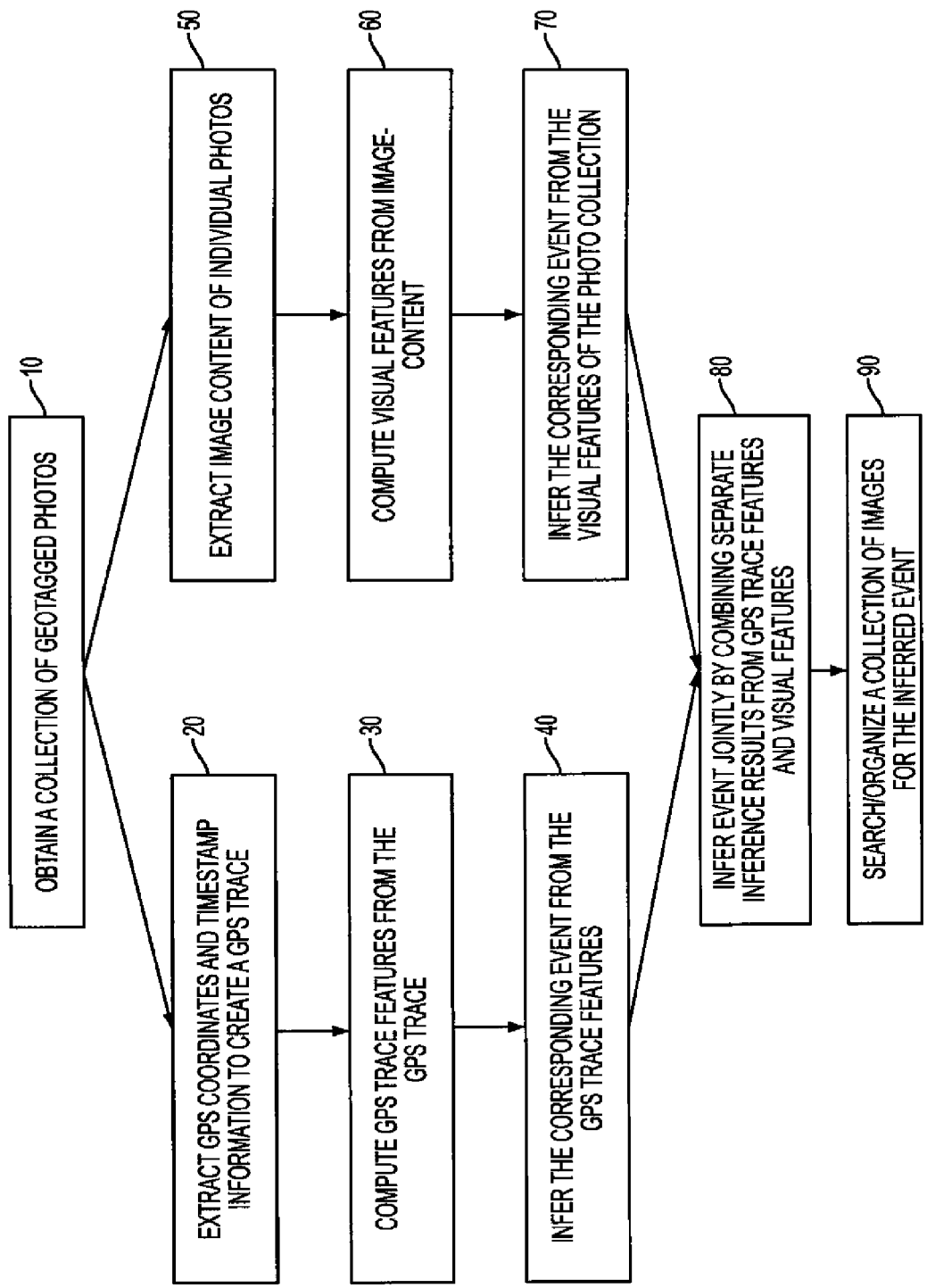
FIGS. 1 and 1a are flow charts for practicing embodiments of the invention.
Figure 1A:
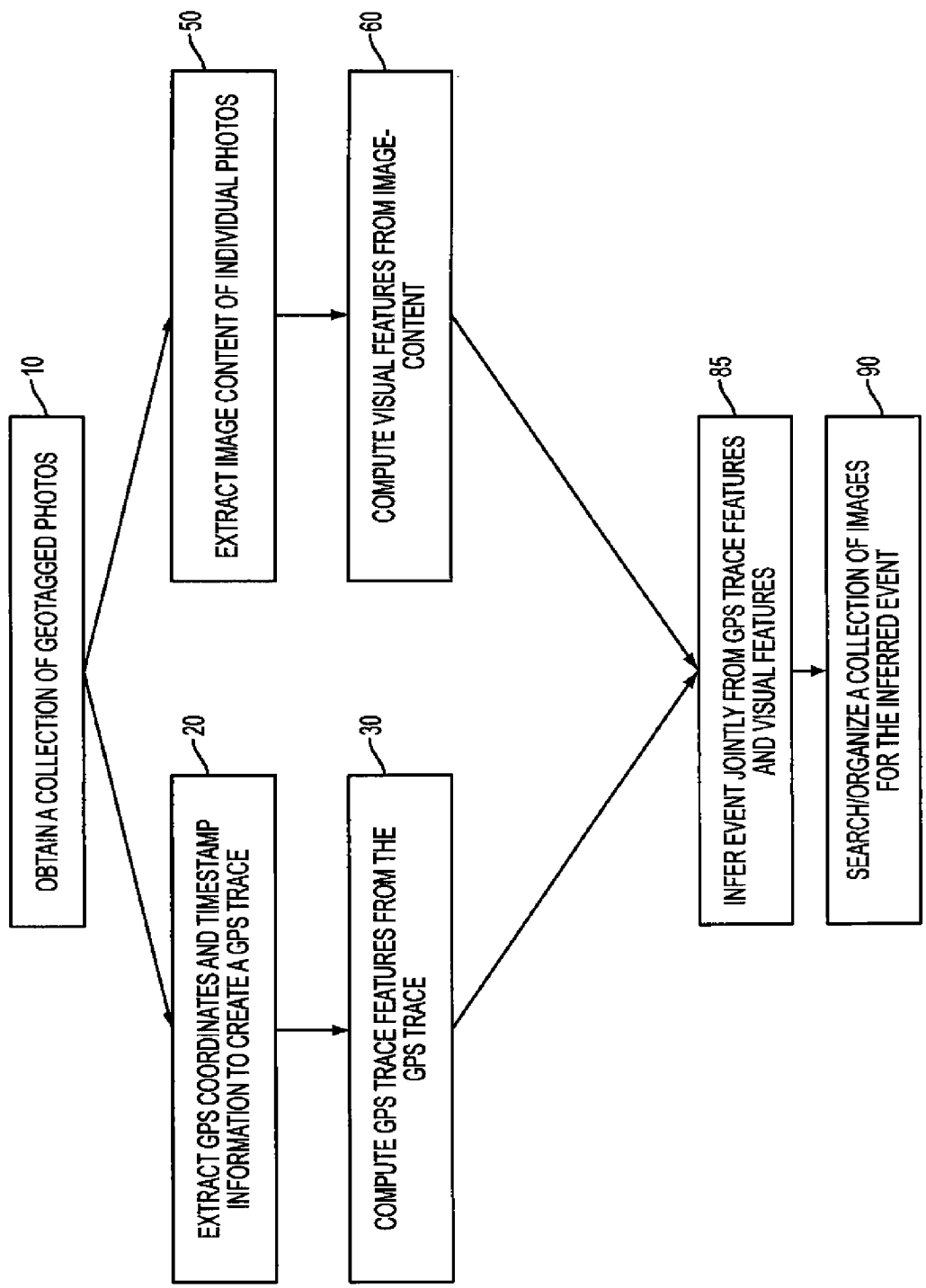

The data processing system 110 includes one or more data processing devices that implement the processes of the various embodiments of the present invention, including the example processes of FIGS. 1 and 1a. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device or component thereof for processing data, managing data, or handling data, whether implemented with electrical, magnetic, optical, biological components, or otherwise.

The processor-accessible memory system 140 includes one or more processor-accessible memories configured to store information, including the information needed to execute the processes of the various embodiments of the present invention, including the example processes of FIGS. 1 and 1a described herein. The processor-accessible memory system 140 may be a distributed processor-accessible memory system including multiple processor-accessible memories communicatively connected to the data processing system 110 via a plurality of computers and/or devices. On the other hand, the processor-accessible memory system 140 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated. Further, the phrase "communicatively connected" is intended to include a connection between devices or programs within a single data processor, a connection between devices or programs located in different data processors, and a connection between devices not located in data processors at all. In this regard, although the processor-accessible memory system 140 is shown separately from the data processing system 110, one skilled in the art will appreciate that the processor-accessible memory system 140 may be stored completely or partially within the data processing system 110. Further in this regard, although the peripheral system 120 and the user interface system 130 are shown separately from the data processing system 110, one skilled in the art will appreciate that one or both of such systems may be stored completely or partially within the data processing system 110.

The peripheral system 120 may include one or more devices configured to provide digital images to the data processing system 110. For example, the peripheral system 120 may include digital video cameras, cellular phones, regular digital cameras, or other data processors. The data processing system 110, upon receipt of digital content records from a device in the peripheral system 120, may store such digital content records in the processor-accessible memory system 140.

The user interface system 130 may include a mouse, a keyboard, another computer, or any device or combination of devices from which data is input to the data processing system 110. In this regard, although the peripheral system 120 is shown separately from the user interface system 130, the peripheral system 120 may be included as part of the user interface system 130.

The user interface system 130 also may include a display device, a processor-accessible memory, or any device or combination of devices to which data is output by the data processing system 110. In this regard, if the user interface system 130 includes a processor-accessible memory, such memory may be part of the processor-accessible memory system 140 even though the user interface system 130 and the processor-accessible memory system 140 are shown separately in FIG. 6.

The present invention facilitates image classification, such as the automatic recognition of typical events in which people take pictures and videos. A goal is to recognize typical events from personal photo collections (some may contain videos), where each event corresponds to a specific human activity taking place in a certain environment, and recorded by a collection of images taken during the event:

$$Ei=\{Ij:j=1, 2, \ldots n\}$$

where Ij denotes an image (or a video). In a preferred embodiment of the present invention, a list of 10 types of frequently occurring events or classifications with reasonably distinctive visual characteristics are defined: C={backyard activity, beach activity, ball game, birthday party, Christmas activity, city tour, hiking, road trip, skiing, and wedding}. Other types of events can be defined and included, and one of ordinary skill in the art will appreciate that the invention is not limited to these events. The list C includes both outdoor and indoor events. In general, event recognition is more challenging and complicated than scene recognition due to the higher level of semantics involved (see L.-J. Li and L. Fei-Fei, "What, where and who? classifying events by scene and object recognition," in Proc. IEEE Intl. Conf. on Computer Vision, 2007.)—the visual content can vary dramatically from one instance to another and causes classifiers to perform poorly.

The classification problem addressed by embodiments of the present invention can be stated as follows:

Input:

A database of visual events are input as training data D for designing a classifier, D={Ei, l(Ei)}, where Ei={Ti,j, Ii,j: j=1, 2, . . . , |Ei|) denotes an individual image folder (group) containing a set of images that constitute a visual event and |Ei| denotes the size of Ei; Ti,j=(xi,j, yi,j, ti,j} is the GPS record of the 2-dimensional location (x, y) and time t of the photo, and Ii,j is the corresponding image. Collectively, all records Ti,j form a trace Ti. For each image folder, it can be uniquely labeled with one of the visual event classes l(Ei) in C, where C={backyard activity, beach activity, ball game, birthday party, Christmas activity, city tour, hiking, road trip, skiing, and wedding}. All images Ii,j share the same label as the group Ei they belong to. The training dataset D should contain sufficient instances of each class in C.

Output:

The label l(Ei) given a new image folder Ei={Tj,j, Ii,j: j=1, 2, . . . |Ei|} and the trained classifier, for example, l(Ei)= hiking.

In any pattern classification problem, one needs to classify a high-dimensional feature vector into one of a set of predefined classes. Due to the redundancy among the features and the limited number of training samples, it is often difficult to find a single good classifier (most likely a non-linear classifier) in the original high-dimensional space. Instead, it is easier to find many weak classifiers in the low-dimensional feature spaces, where each constructed classifier in the discovered subspace serves as a weak classification rule. In an embodiment of the present invention, an effective method is to combine these discovered weak classifiers in the low-dimensional space through multi-class boosting to create a final classifier. Boosting is well known in the art and other similar procedures for creating a final classifier can be used without deviating from the scope of this invention.

In FIG. 1, a method for classifying a group of temporally related images is shown, according to an embodiment of the present invention. First, a group of temporally related images having capture location information are obtained at step 10. This group or images, sometimes referred to herein as a collection, has been or is sorted into groups of temporal and location-related photos according to techniques known in the art. In addition, this collection of images may be geotagged using a digital camera equipped with a GPS receiving sensor. Alternatively, the geotagged photos can be acquired using a digital camera that can communicate with a standalone GPS receiver (for example through a Bluetooth link). Other alternatives are for photos to be manually tagged with coordinates after capture, or synchronized in batch with a GPS logging device. For a geotagged photo collection that corresponds to a particular event, GPS coordinates and timestamp information are first extracted to form a sparse trace in space and time in step 20. The trace is considered a capture-location sequence. Note that it is not imperative for each photo to be associated with location information, as long as there are enough photos with location information to form a trace for the entire group of temporally related images.

Next, trace features are computed to characterize the shape or structure of a trace in step 30. Such trace features are used to infer the corresponding event or classification for the collection in step 40. The inference is performed by comparing information associated collectively with the capture-location sequence with each of a plurality of sets of expected capture-location-sequence characteristics, each set associated with a classification for an event.

In addition to using capture-location sequence information, such as a location-sequence trace in steps 20-40, to classify the collection, image content information in the collection optionally may be used, as reflected by steps 50-70. In particular, image content, i.e. pixel information, may be extracted from each individual photo in step 50, followed by step 60 where visual features are computed from the image content. The event or classification can be inferred in step 70 from the visual features collectively represented by all the individual photos in the same event. Again, the inference is performed by comparing image-content information associated collectively with the group of temporally related images with each of a plurality of sets of expected image-content characteristics, each set associated with a classification of an event. Because there are two parallel inference paths, the event can be inferred jointly by combining the inference results separately obtained from the trace features and the visual features in step 80.

Finally, the inferred event information can be used in step 90 to search in a large database for photos of a particular event, or annotate a collection of photos for other uses.

FIG. 1a is an alternative method where the event is inferred jointly from the combined trace features and visual features, i.e., combined information, in step 85, without the intermediate steps of inference separately from trace features and visual features.

A few example cases can illustrate how the present invention performs better than the systems that only use visual information. Assume that a group of people took a road trip and went through a major city. Also assume that they took pictures in the city and on the road. Using visual information alone, the visual classifier likely would correctly classify many pictures in this event as "city tour" but likely would mischaracterize the entire event. With the capture-location-sequence trace associated with the pictures, however, the entire group of pictures has a greater chance of being correctly classified as a road trip (albeit through a city). After information fusion, the final decision is that this event is a road trip (note that the present invention learns that it is possible for a road trip event to contain pictures of a city).

Another example would be that a group of people went hiking in the woods. Since backyard pictures can also contain trees, the visual classifier may mistakenly decide that this is a backyard event. Again with the capture-location sequence trace associated with the pictures, however, embodiments of the present invention have a greater chance of correctly determining that the entire event was hiking, as opposed to a backyard event.

Different from traditional image and visual event classification problems where only visual features are applicable, embodiments of the present invention utilize two types of features: (1) GPS features and (2) visual features. In particular, the GPS features are defined over a collection of images that are related to the same event and, therefore, are characteristics of the entire collection of images rather than only for an individual image. Within the context of the present invention, a collection of photos is also referred to as a folder.

The sparse traces mentioned in FIG. 1 can indeed be useful for differentiating various events. As summarized in FIG. 2, simply according to the spatial range and speed of movement, one can sort events into different clusters, each of which is associated with a label as defined earlier. Embodiments of the present invention may assume that photos have been grouped in advance into groups of temporal and location-related photos according to techniques known in the art. Events such as city tour, hiking, and road trip cover a large spatial range, while backyard, beach, ball game, picnic, and wedding events tend to be spatially confined. While in road trips, people travel at considerably high speed, the movement is much slower for city tour, hiking, backyard, beach, ball game, picnic, and wedding. More sophisticated features beyond range and speed can be designed to characterize the shape or structure of the traces.

Figure 3:
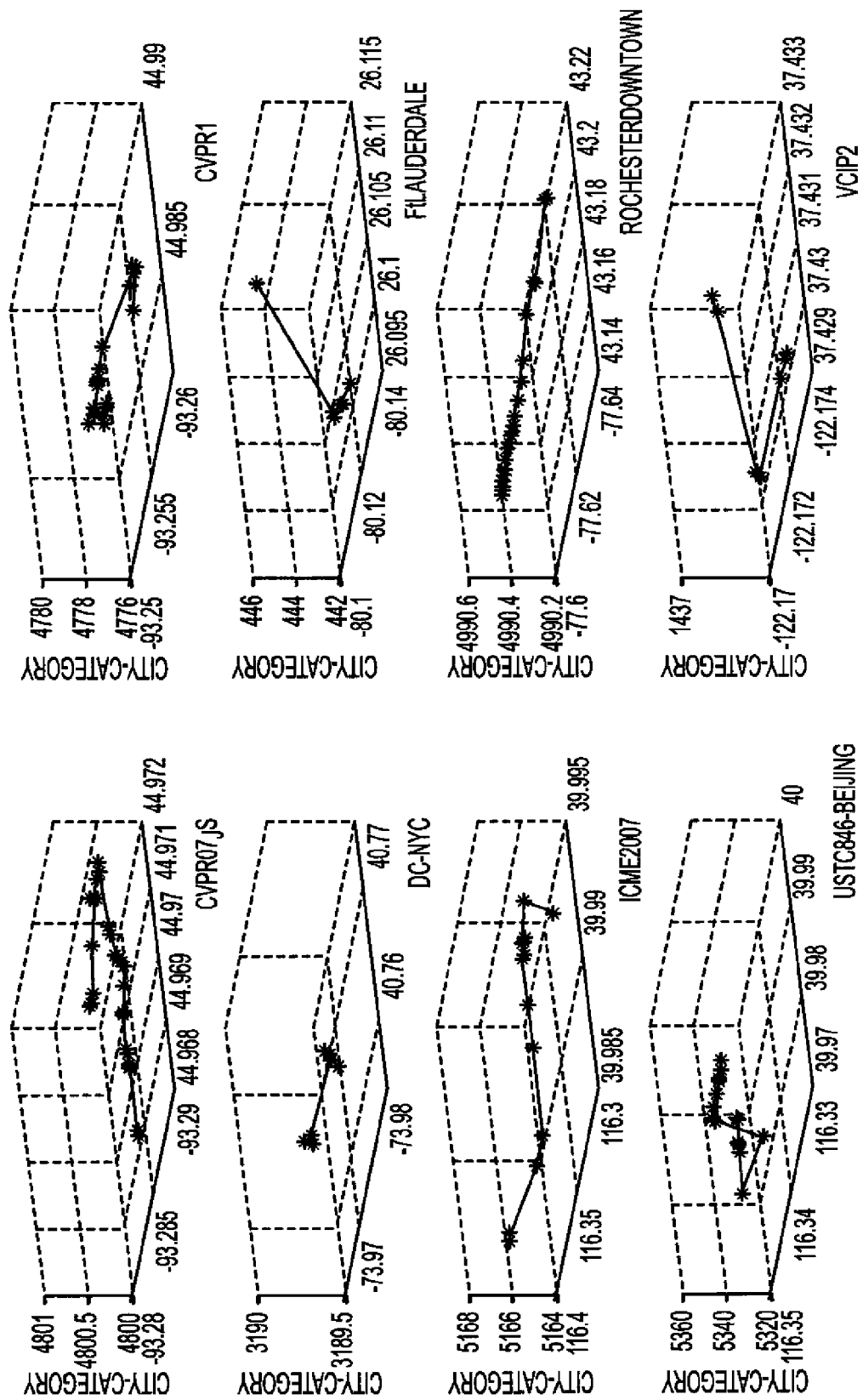
FIGS. 3 and 4 depict examples of traces in space and time related to city tour events and hiking events, respectively.
Figure 4:
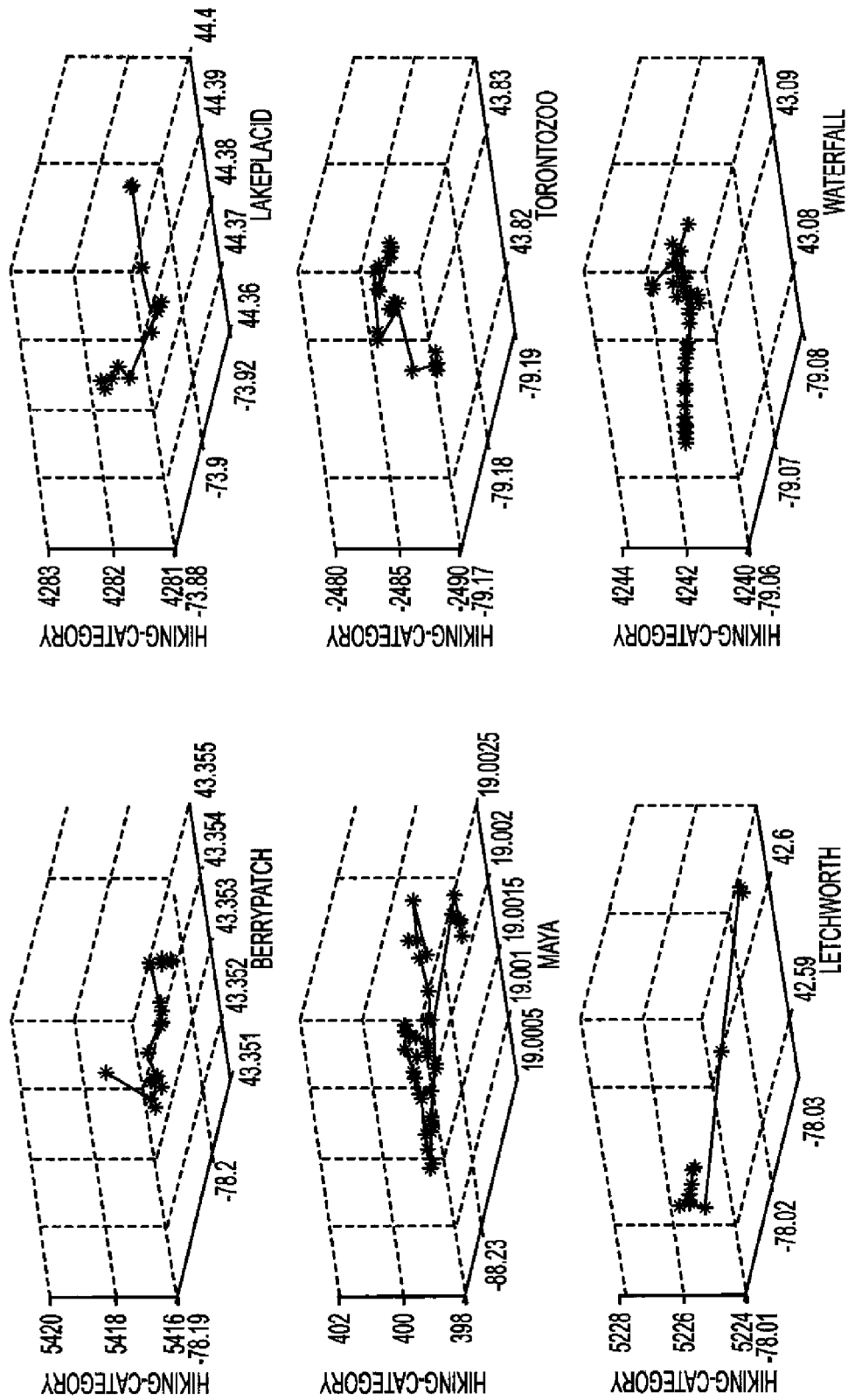

Based on the GPS information recorded, each image folder is represented by a space-time trace: $T_i=\{(x_{i,j}, y_{i,j}, t_{i,j})|, j=1, \ldots, |T_i|\}$ where $|T_i|$ equals the size of the folder, i.e., the number of images. The sequence of points in space-time domain, provide an indication of the underlying movement that the photographer went through during image capture. This sequence alone, independent of the corresponding images taken at such points in space-time, is informative for the task of event recognition. FIG. 3 and FIG. 4 contain the GPS traces for a few city tour events and hiking events, respectively. These traces may be used in the training data D for designating the classifier, referred to in the "input" portion of the classification problem described above. It is noticeable that the shape characteristics of the traces for these two types of events are distinctively different from each other while at the same time the traces for the same type of event look similar. While both events tend to cover a relatively large extent in space and time, the city tour traces exhibit a higher degree of regularity in the shapes of the traces because of the underlying city block and street structures. In comparison, the hiking traces look more random and arbitrary even though they can also be zigzagged. In other words, there exist structural similarities among different instances of movement for the same event type, while there exist structural differences between movements that correspond to different event types.

Given such a space-time trace, in a preferred embodiment of the present invention, the following 13 types of features, with varying amounts of importance to be determined by training and in the range of [0.0, 1.0] without loss of generality, are extracted in step 50 as a representation for shape or structure of a trace:

Entropy (2 features): temporal and spatial domain
Distance to the centroid (1 feature)
Variance (2 features): temporal and spatial domain
Skewness (2 features): temporal and spatial domain
Tkurtosis (2 features): temporal and spatial domain
Spatial range (1 feature) and Temporal Duration (1 feature)
Trace Length (1 feature) and Average Speed (1 feature)

For example, below are the definitions of the spatial range and spatial variance listed above: (1) the spatial range SR(Ti) of the trace Ti, describing the activity spatial range of the visual event:

$$SR(T) = (\max\{x_j | x_j \in T\} - \min\{x_j | x_j \in T\}) \times (\max\{y_j | y_j \in T\} - \min\{y_j | y_j \in T\}); \quad (1)$$

and (2) the spatial variance SV (Ti) of the trace, describing spatial variances of the activity:

$$SV(T) = \frac{1}{2}[\text{VAR}(\{x_j | x_j \in T\}) + \text{VAR}(\{y_j | y_j \in T\})]; \quad (2)$$

Other types of features are the low-level visual features that are computed in step 60 from the images. Visual vocabularies have proved to be an effective way of building visual recognition systems, for example, for scene recognition (see S. Lazebnik, C. Schmid, and J. Ponce, "Beyond bags of features: spatial pyramid matching for recognizing natural scene categories," in Proc. IEEE Conf. on Computer Vision and Pattern Recognition, 2006.). An image is partitioned by a fixed grid and represented as an unordered set of image patches. Suitable descriptions are computed for such image patches and clustered into bins to form a "visual vocabulary". In embodiments of the present invention, the same methodology may be adopted and extended to consider both color and texture features for characterizing each image grid.

In an embodiment of the present invention, to extract color features, an image grid is further partitioned into 2×2 equal size sub-grids. Then for each sub-grid, the mean R, G and B values are extracted to form a 4×3=12 feature vector that characterizes the color information of 4 sub-grids. To extract texture features, a 2×2 array of histograms with 8 orientation bins in each sub-grid is computed. Thus a 4×8=32-dimensional SIFT descriptor is applied to characterize the structure within each image grid, similar in spirit to Lazebnik. In an embodiment of the present invention, if an image is larger than 200 k pixels, it is first resized to 200 k pixels. An image grid size of 16×16 is then set with overlapping sampling intervals of 8×8. Typically, one image generates 117 such grids.

After extracting all the raw image features from image grids, in an embodiment of the present invention, separate color and texture vocabularies are built by clustering all the image grids in the training dataset through k-means clustering. Both vocabularies are set to size 500. By accumulating all the grids in an event (a collection of images), two normalized histograms are obtained for an event, namely hc and ht, corresponding to the word distribution of color and texture vocabularies, respectively. Concatenating hc and ht, the result is an normalized word histogram:

$$\sum_{i=1}^{1000} h_i(E) = 1.$$

Each bin in the histogram indicates the occurrence frequency of the corresponding word. The feature vector f thus has the response:

$$f_i(E) = \begin{cases} 1 & \text{if } h_i(E) > \theta_i \\ 0 & \text{else,} \end{cases} \quad (3)$$

where $0 < \theta_i < 1$ is a quantization threshold. The simplified index function is considered, namely fi giving a positive response when the i-th word Ω frequently enough in the event with null response otherwise. There are two types of visual vocabularies Ωc and Ωt, where Ωc is the color primitive, whereas Ωt is the texture primitive. Denoting the complete vocabulary as $\Omega = \hat{\Omega}_c \cup \Omega_t$, visual features can be computed to represent both color and texture information.

Besides low-level visual feature, one can also consider semantic visual features derived from object and scene detections. For each image, one can define a set of scene categories:

S={outdoor, manmade, beach, sunset, mountain, ... } and a set of object categories:

O={grass, blue sky, sand, snow, ... }.

It is well known that a set of binary SVM-classifiers can be built for these scenes and objects, see for example in Lazebnik. Instead of making a deterministic decision, a preferred embodiment of the present invention maintains a probabilistic score ranging from [0, 1] to indicate whether an image contain a specific object or scene. Note that each image is allowed to be assigned multiple scene or object labels. Consequently, for each image I, the result is a k-dimensional real-valued feature vector with each value within 0, 1], where k equals to the sum of scene and object categories and each value corresponds to a detection score from the respective SVM classifiers.

After the visual features are computed, a multi-class AdaBoost method called stagewise additive modeling with exponential loss (SAMME) can be used to build visual classifiers using the images in the training dataset D, as well a capture-location-sequence trace classifier using the capture-location-sequence traces in the training set D. The detail of SAMME can be found in (J. Zhu, S. Rosset, H. Zou, and T. Hastie, "Multi-class Adaboost," Technical Report, 2005, Stanford University). SAMME directly handles the K-class problem by building a single K-class classifier, instead of K binary ones. The solution of SAMME is consistent with the Bayes classification rule, thus it is optimal in minimizing the misclassification error.

A popular fusing scheme (e.g. boosting) is using a linear combination of many weak classifiers to create a strong classifier. The final decision is:

$$\hat{\mathcal{H}}(\mathcal{D}_q) = \sum_{i=1}^{L} w_i h_i(\mathcal{D}_q), \quad (4)$$

Where $w_t|$ is the weight need to be optimized and $h_t(D_q) \in \{0, 1\}$ indicates the response from the weak classifier $h_t(D_q)|$.

Once individual classifiers are built for each of the trace features, low-level visual features, and semantic visual features, the present invention combines the results of these parallel classifications through information fusion, For a naïve fusion scheme, one can compute, for example for 8 event classes, GPS output:$hg(X)$=[4.2 0.0 0.5 4.9 0.0 0.0 0.0 0.7]

Visual output:$hv(X)$=[1.2 0.7 4.1 1.7 3.1 0.0 2.0 0.0]

Sum of output:$h(X)$=$hg(X)$+$hv(X)$ $$h(X)=[5.4\ 0.7\ 5.6\ 6.6\ 3.1\ 0.0\ 2.0\ 0.7] \quad (5)$$

In this case, the predicted label=arg max h(X)=4.

In a preferred embodiment of the present invention, the reliability of each class is accounted for through confidence-based fusion, akin to probabilistic fusion using a Bayesian Network, i.e., $$h(X)=Wg \times hg(X)+Wv \times hv(X) \quad (6)$$

Figure 5:
FIG. 5 is depicts an example confusion matrix and a procedure for computing a confidence used to combine recognition outcome from multiple modalities of cues.

The weight or confidence can be computed based on the confusion matrix of the corresponding mode (trace, visual, or semantic) of classification. The confusion matrix is well known in the art and it represents how samples of each class (in each row) is classified into each of the possible classes (each column). Therefore, a good classifier should have a confusion matrix with most nonzero values concentrated along the diagonal of the matrix. Using the example confusion matrix in FIG. 5 for a 8-class problem for a certain mode, the weight for the first class for this mode is computed as $$Wg(1)=5/(5+2+4+0+1+2+0+1)=1/3 \quad (7)$$

Where the denominator is the sum of the first column. Simply put, out of the 15 samples classified to class 1 in this mode, 5 are indeed in class 1, so the confidence is ⅓.

The invention has been described in detail with particular reference to certain preferred embodiments thereof, but it will be understood that variations and modifications can be effected within the spirit and scope of the invention.

PARTS LIST 10 step: acquire a collection of geotagged photos
20 step: extract GPS coordinates from geotagged photos and their timestamp information to create a trace
30 step: compute trace features from the trace
40 step: infer the corresponding event from the trace features
50 step: extract image content of individual photos
60 step: compute visual features from image-content
70 step: infer the corresponding event from the visual features of the photo collection
80 step: infer event jointly by combining separate inference results from trace features and visual features
85 infer event jointly from trace features and visual features
90 step: search/organize a collection of images for the inferred event

The invention claimed is:

1. A method implemented at least in part by a data processing system, the method for facilitating classification of a group of temporally related images, and the method comprising the steps of:
    identifying a capture-location sequence from the group of temporally related images;
    comparing capture-location-sequence information, which is associated collectively with the capture-location sequence, with each of a plurality of sets of predetermined capture-location-sequence characteristics, each set associated with a predetermined classification;
    identifying an identified classification associated with the group of temporally related images based at least upon results from the comparing step; and
    storing the identified classification in a processor-accessible memory system.

2. The method of claim 1, wherein the capture-location sequence is identified based at least upon GPS information associated with at least some of the images in the group.

3. The method of claim 1, further comprising the step of comparing image-content information, which is associated collectively with the group of temporally related images, with each of a plurality of sets of predetermined image-content characteristics, each set of predetermined image-content characteristics associated with a predetermined classification, wherein the identifying step identifies the identified classification based at least upon results from the two comparing steps.

4. The method of claim 1, wherein the identified classification is identified from one of the predetermined classifications.

5. The method of claim 1, wherein the capture-location-sequence information comprises a trace of the capture-location sequence.

6. The method of claim 5, wherein the trace includes a spatial and a temporal domain.

7. The method of claim 5, further comprising the step of: determining a feature of the trace, the feature pertaining to a spatial range represented by the trace or a speed of movement represented by the trace, wherein the comparing step involves comparing the feature to a corresponding value or range of values represented in at least one of the sets of predetermined capture-location-sequence characteristics.

8. The method of claim 5, further comprising the step of:
    determining a feature of the trace, the feature pertaining to an entropy, a distance to a centroid, a variance, a skewness, a kurtosis, a spatial range, a temporal duration, a length, or a speed,
    wherein the comparing step involves comparing the feature to a corresponding value or range of values represented in at least one of the sets of predetermined capture-location-sequence characteristics.

9. The method of claim 1, wherein the predetermined classifications comprise hiking and city tour.

10. The method of claim 9, wherein the predetermined classifications further comprise a wedding, a ball game, a backyard activity, a beach activity, a road trip, a picnic, a Christmas activity, and a Birthday party.

11. A processor-accessible memory system storing instructions configured to cause a data processing system to implement a method for facilitating classification of a group of temporally related images, wherein the instructions comprise:
    instructions for identifying a capture-location sequence from the group of temporally related images;
    instructions for comparing capture-location-sequence information, which is associated collectively with the capture-location sequence, with each of a plurality of sets of predetermined capture-location-sequence characteristics, each set associated with a predetermined classification;
    instructions for identifying an identified classification associated with the group of temporally related images based at least upon results from the comparing step; and instructions for storing the identified classification in a processor-accessible memory system.

12. The processor-accessible memory system of claim 11, wherein the capture-location-sequence information comprises a trace of the capture-location sequence.

13. The processor-accessible memory system of claim 12, wherein the trace includes a spatial and a temporal domain.

14. The processor-accessible memory system of claim 12, further comprising the step of:
   determining a feature of the trace, the feature pertaining to a spatial range represented by the trace or a speed of movement represented by the trace,
   wherein the comparing step involves comparing the feature to a corresponding value or range of values represented in at least one of the sets of predetermined capture-location-sequence characteristics.

15. The processor-accessible memory system of claim 12, further comprising the step of:
   determining a feature of the trace, the feature pertaining to an entropy, a distance to a centroid, a variance, a skewness, a tkurtosis, a spatial range, a temporal duration, a length, or a speed,
   wherein the comparing step involves comparing the feature to a corresponding value or range of values represented in at least one of the sets of predetermined capture-location-sequence characteristics.

16. A system comprising:
a data processing system; and
a memory system communicatively connected to the data processing system and storing instructions configured to cause the data processing system to implement a method for facilitating classification of a group of temporally related images, wherein the instructions comprise:
instructions for identifying a capture-location sequence from the group of temporally related images;
instructions for comparing capture-location-sequence information, which is associated collectively with the capture-location sequence, with each of a plurality of sets of predetermined capture-location-sequence characteristics, each set associated with a predetermined classification;
instructions for identifying an identified classification associated with the group of temporally related images based at least upon results from the comparing step; and
instructions for storing the identified classification in the memory system.

17. The memory system of claim 16, wherein the capture-location-sequence information comprises a trace of the capture-location sequence.

18. The memory system of claim 17, wherein the trace includes a spatial and a temporal domain.

19. The memory system of claim 17, further comprising the step of:
   determining a feature of the trace, the feature pertaining to a spatial range represented by the trace or a speed of movement represented by the trace,
   wherein the comparing step involves comparing the feature to a corresponding value or range of values represented in at least one of the sets of predetermined capture-location-sequence characteristics.

20. The memory system of claim 17, her comprising the step of:
   determining a feature of the trace, the feature pertaining to an entropy, a distance to a centroid, a variance, a skewness, a kurtosis, a spatial range, a temporal duration, a length, or a speed,
   wherein the comparing step involves comparing the feature to a corresponding value or range of values represented in at least one of the sets of predetermined capture-location-sequence characteristics.

* * * * *